United States Patent
Brückner et al.

(10) Patent No.: US 9,291,345 B2
(45) Date of Patent: Mar. 22, 2016

(54) METHOD FOR OPERATING A CONTINUOUS FLOW STEAM GENERATOR

(75) Inventors: Jan Brückner, Uttenreuth (DE); Joachim Franke, Nürnberg (DE); Frank Thomas, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 948 days.

(21) Appl. No.: 12/996,843

(22) PCT Filed: May 27, 2009

(86) PCT No.: PCT/EP2009/056469
§ 371 (c)(1),
(2), (4) Date: Feb. 23, 2011

(87) PCT Pub. No.: WO2009/150055
PCT Pub. Date: Dec. 17, 2009

(65) Prior Publication Data
US 2011/0139094 A1    Jun. 16, 2011

(30) Foreign Application Priority Data
Jun. 12, 2008  (EP) .................................. 08010726

(51) Int. Cl.
| | |
|---|---|
| F22B 35/10 | (2006.01) |
| F22D 5/26 | (2006.01) |
| F22D 1/32 | (2006.01) |
| F22B 37/38 | (2006.01) |

(52) U.S. Cl.
CPC ...................... F22B 35/10 (2013.01)

(58) Field of Classification Search
None
See application file for complete search history.

(56) References Cited

U.S. PATENT DOCUMENTS

| | | | | | |
|---|---|---|---|---|---|
| 2,032,182 | A | * | 2/1936 | Oman | 159/16.1 |
| 2,800,955 | A | * | 7/1957 | Honig et al. | 159/47.1 |
| 2,879,750 | A | * | 3/1959 | Engel | 122/379 |
| 3,213,831 | A | * | 10/1965 | Hochmuth | 122/1 R |

(Continued)

FOREIGN PATENT DOCUMENTS

| | | |
|---|---|---|
| EP | 0639253 | 2/1995 |
| EP | 1614962 A1 | 1/2006 |

(Continued)

OTHER PUBLICATIONS

Kastner et al., BWK Brennstoff Warme Kraft, "Verbesserte Speisewasserregelung durch kompaktes Meβwywtem zur Massenstrom-und Dampfgehaltsbestimmung", Springer VDI, Verlag, Düsseldorf, DE, Dec. 12, 1993, pp. 510-514, vol. 45, Nr. 12, XP000406704, ISSN: 1618-193X; Magazine.

*Primary Examiner* — Gregory Huson
*Assistant Examiner* — Eric Gorman

(57) ABSTRACT

A method for operating a continuous flow steam generator with an evaporator heating surface is provided. A target value for a supply water mass flow is fed to a device for adjusting the supply water mass flow. In order to improve the quality of a predictive supply water or mass flow control and to maintain the enthalpy of the flow medium at the evaporator outlet particularly stable especially when load changes occur, a correction factor is taken into consideration during production of the target value for the supply water mass flow. The correction factor is a characteristic of the temporal derivative of enthalpy or the density of the flow medium at the input of one or more heating surfaces.

16 Claims, 1 Drawing Sheet

(56) References Cited

U.S. PATENT DOCUMENTS

| | | | | |
|---|---|---|---|---|
| 3,223,074 A * | 12/1965 | Tanner et al. | | 122/2 |
| 3,331,202 A * | 7/1967 | Brunner | | 60/39.182 |
| 3,401,674 A * | 9/1968 | Palchik | | 122/406.4 |
| 3,470,853 A * | 10/1969 | Klaus | | 122/406.4 |
| 3,508,526 A * | 4/1970 | Rupprecht | | 122/406.4 |
| 3,561,406 A * | 2/1971 | Rupprecht | | 122/32 |
| 3,575,002 A * | 4/1971 | Vuia | | 376/317 |
| 3,576,178 A * | 4/1971 | Zmola | | 122/32 |
| 3,774,396 A * | 11/1973 | Borsi et al. | | 60/645 |
| 3,834,358 A * | 9/1974 | Frendberg et al. | | 122/510 |
| 3,947,319 A * | 3/1976 | de Boer et al. | | 376/210 |
| 4,211,207 A * | 7/1980 | Molivadas | | 126/587 |
| 4,232,635 A * | 11/1980 | Losel | | 122/406.5 |
| 4,551,796 A * | 11/1985 | Singh | | 700/28 |
| 4,930,454 A * | 6/1990 | Latty et al. | | 122/4 D |
| 4,987,862 A * | 1/1991 | Wittchow et al. | | 122/6 A |
| 5,020,335 A * | 6/1991 | Albers et al. | | 62/271 |
| 5,031,466 A * | 7/1991 | Redus | | 73/861.04 |
| 5,485,754 A * | 1/1996 | Harpster | | 73/861.04 |
| 5,529,021 A * | 6/1996 | Butterlin et al. | | 122/448.1 |
| 5,968,320 A * | 10/1999 | Sprague | | 202/113 |
| 6,044,804 A * | 4/2000 | Franke et al. | | 122/448.1 |
| 6,053,725 A * | 4/2000 | Pompei et al. | | 431/4 |
| 6,109,020 A * | 8/2000 | Liebig | | 60/39.182 |
| 6,173,679 B1 * | 1/2001 | Bruckner et al. | | 122/406.4 |
| 6,192,837 B1 * | 2/2001 | Wittchow | | 122/406.4 |
| 6,269,754 B1 * | 8/2001 | Ruegg et al. | | 110/234 |
| 6,343,570 B1 * | 2/2002 | Schmid et al. | | 122/7 R |
| 6,446,580 B2 * | 9/2002 | Franke et al. | | 122/6 A |
| 6,446,584 B1 * | 9/2002 | Franke et al. | | 122/460 |
| 6,557,499 B2 * | 5/2003 | Franke et al. | | 122/1 B |
| 6,868,807 B2 * | 3/2005 | Franke et al. | | 122/406.4 |
| 7,281,499 B2 * | 10/2007 | Franke et al. | | 122/406.5 |
| 7,383,791 B2 * | 6/2008 | Franke et al. | | 122/406.4 |
| 7,624,708 B2 * | 12/2009 | Butterlin et al. | | 122/448.1 |
| 2001/0037641 A1 * | 11/2001 | Hannemann et al. | | 60/39.12 |
| 2004/0088984 A1 * | 5/2004 | Gobrecht et al. | | 60/653 |
| 2004/0172951 A1 * | 9/2004 | Hannemann et al. | | 60/776 |
| 2004/0182330 A1 * | 9/2004 | Frutschi | | 123/25 A |
| 2005/0072154 A1 * | 4/2005 | Frutschi | | 60/670 |
| 2006/0075977 A1 * | 4/2006 | Franke et al. | | 122/406.4 |
| 2006/0112682 A1 * | 6/2006 | Baba | | 60/320 |
| 2006/0192023 A1 * | 8/2006 | Franke et al. | | 237/67 |
| 2006/0254283 A1 * | 11/2006 | Savic et al. | | 60/775 |
| 2006/0288962 A1 * | 12/2006 | Franke et al. | | 122/1 C |
| 2007/0028859 A1 * | 2/2007 | Franke et al. | | 122/460 |
| 2007/0034167 A1 * | 2/2007 | Franke et al. | | 122/7 R |
| 2008/0066695 A1 * | 3/2008 | Butterlin et al. | | 122/406.1 |
| 2008/0115743 A1 * | 5/2008 | Effert et al. | | 122/7 R |
| 2012/0048717 A1 * | 3/2012 | Frick | | 203/22 |
| 2013/0075245 A1 * | 3/2013 | Frick | | 203/22 |
| 2013/0125842 A1 * | 5/2013 | Frick | | 122/7 R |
| 2014/0034044 A1 * | 2/2014 | Birnbaum et al. | | 126/714 |
| 2014/0109547 A1 * | 4/2014 | Bruckner et al. | | 60/39.182 |

FOREIGN PATENT DOCUMENTS

| | | |
|---|---|---|
| EP | 2065641 A2 | 6/2009 |
| JP | 62178803 A | 8/1987 |
| JP | 7158808 A | 6/1995 |
| JP | 2008506087 A | 2/2008 |
| WO | WO 9322599 A1 | 11/1993 |
| WO | WO 2006005708 A1 | 1/2006 |

* cited by examiner

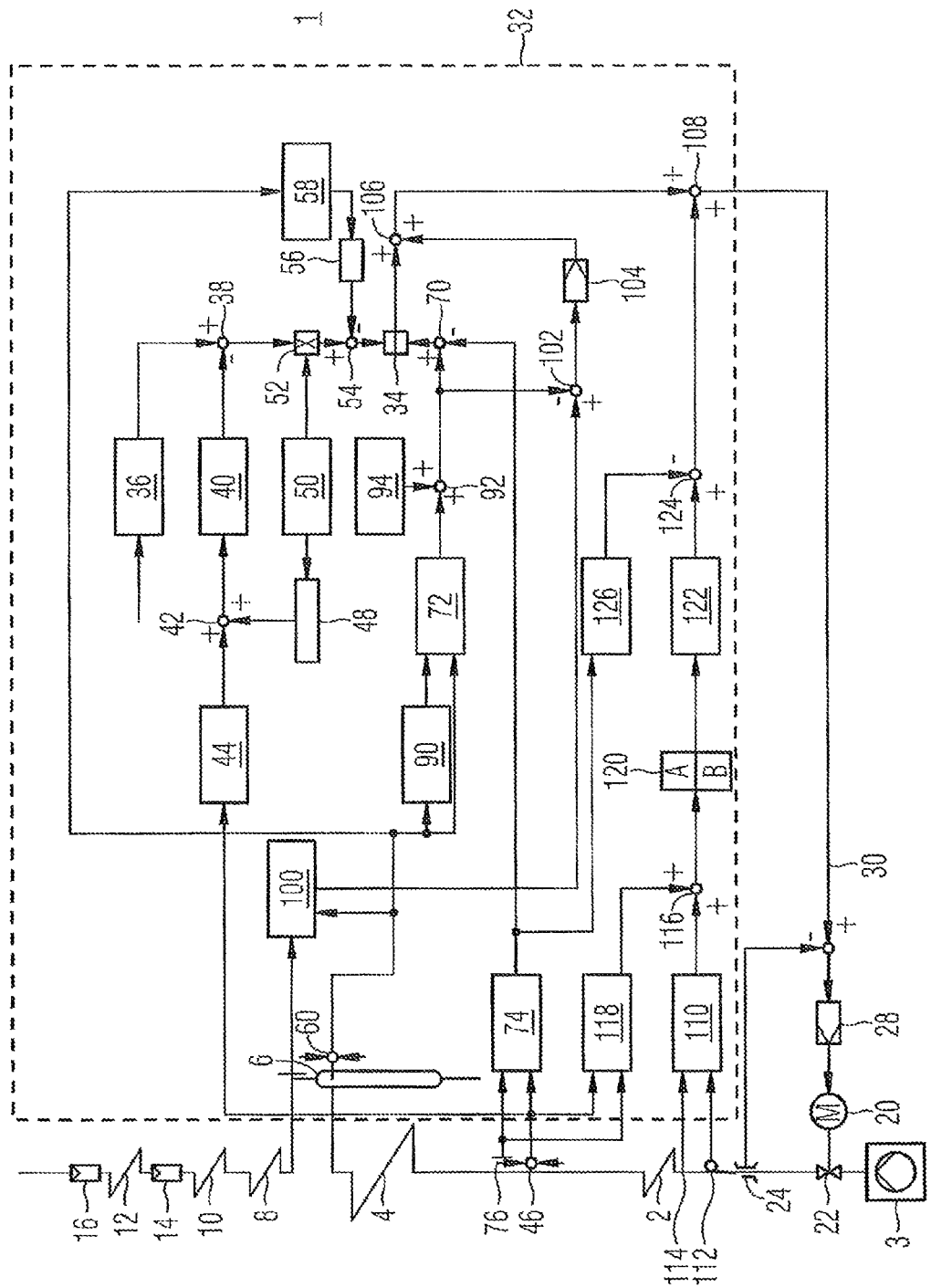

METHOD FOR OPERATING A CONTINUOUS FLOW STEAM GENERATOR

CROSS REFERENCE TO RELATED APPLICATIONS

This application is the US National Stage of International Application No. PCT/EP2009/056469 filed May 27, 2009, and claims the benefit thereof. The International Application claims the benefits of European Patent Application No. 08010726.1 EP filed Jun. 12, 2008. All of the applications are incorporated by reference herein in their entirety.

FIELD OF INVENTION

The invention relates to a method for operating a once-through steam generator having a plurality of heating surfaces, wherein a setpoint value $\dot{M}s$ for the feedwater mass flow $\dot{M}$ is supplied to a device for adjusting the feedwater mass flow $\dot{M}$. The invention further relates to a forced-flow once-through steam generator for performing the method.

BACKGROUND OF INVENTION

In a once-through steam generator, heating a plurality of steam generator tubes which collectively form an evaporator heating surface leads to a complete evaporation of a flow medium in the steam generator tubes in one pass. Prior to its evaporation the flow medium—typically water—is in this case normally supplied to a preheater, usually also referred to as an economizer, which is connected upstream of the evaporator heating surface on the flow medium side, where it is preheated.

The feedwater mass flow into the evaporator heating surface is regulated as a function of the operating state of the once-through steam generator and, in connection therewith, of the current steam generator output. In the event of load changes the evaporator throughflow rate should be varied as far as possible in synchronism with the heat input into the evaporator heating surface, because otherwise it is not possible to avoid with certainty a deviation of the specific enthalpy of the flow medium at the outlet of the evaporator heating surface from the setpoint value. Such an undesirable deviation of the specific enthalpy makes it more difficult to regulate the temperature of the live steam being discharged from the steam generator and furthermore leads to high material stresses and consequently to a reduced useful life of the steam generator.

In order to keep deviations of the specific enthalpy from the setpoint value and undesirably large fluctuations in temperature resulting therefrom in all operating states of the steam generator, i.e. in particular also in transient states or during load changes, as small as possible, the feedwater throughflow rate adjustment can be embodied in the manner of what is termed a predictive or anticipatory implementation. In this case the necessary feedwater setpoint values should be provided in particular also in the case of load changes as a function of the current operating state or the operating state that is to be expected in the immediate future.

EP 0 639 253 discloses a once-through steam generator in which the feedwater throughflow rate is regulated by way of a precalculation of the required volume of feedwater. Serving as a basis for the calculation method in this case is the heat flow balance of the evaporator heating surface, into which the feedwater mass flow should enter, in particular at the inlet of the evaporator heating surface. The setpoint value for the feedwater mass flow is in this case specified from the ratio of the heat flow currently transferred from the heating gas to the flow medium in the evaporator heating surface on the one hand and a setpoint enthalpy increase of the flow medium in the evaporator heating surface specified with regard to the desired live steam state on the other hand.

In real-world situations, however, measuring the feedwater mass flow directly at the inlet of the evaporator heating surface has proven technically complex and cannot be performed reliably in every operating state. Instead of this the feedwater mass flow is alternatively measured at the inlet of the preheater and incorporated into the calculations of the feedwater volume, though said feedwater mass flow is not equal in every case to the feedwater mass flow at the inlet to the evaporator heating surface.

In order to counteract the inaccuracies caused thereby in the specification of a setpoint value for the feedwater mass flow that is particularly appropriate to demand, in particular when load changes occur, it is provided in an alternative concept of a predictive mass flow regulation as known from WO 2006/005708 A1 to take into account the feedwater density at the inlet to the preheater as one of the input variables for regulating the feedwater throughflow rate.

Both of the cited concepts for predictive mass flow regulation are based on the setpoint value for the steam generator output as the principal input variable, from which the characteristic values being incorporated into the actual determination of the setpoint value are calculated on the basis of stored correlations and in particular with recourse to previously obtained calibration or reference measurements. This, however, presupposes sufficiently stable system characteristics overall that are unequivocally attributable to a firing capacity, as are typically present in fired steam generators. However, conditions of this kind are not present in other systems, such as for example in an embodiment of the once-through steam generator as a heat recovery boiler for recovering heat from the exhaust gas of an upstream gas turbine. Moreover, in these types of systems connected as heat recovery boilers a firing capacity cannot be used to the same extent as a free parameter as in directly fired boilers, since in the case of a connection as a heat recovery boiler the operation of the gas turbine is usually regarded as the primary criterion for controlling the overall installation, with the other components being adjusted to bring them into line with the system state of said gas turbine.

In order to take account of this knowledge, a further improved predictive mass flow regulation for a once-through heat recovery steam generator is known from EP 2 065 641. The concept disclosed therein provides a precontrolled calculation of the feedwater volume by way of heat flow balancing of the evaporator, preferably including the superheater heating surfaces connected upstream on the exhaust gas side. This means that under favorable conditions for the available heat present on the exhaust gas side an evaporator throughflow rate that is adjusted to demand can be set at all times. For smaller corrections of the feedwater mass flow an overlaid and slow-acting enthalpy controller is provided in this case.

SUMMARY OF INVENTION

An object of the invention is to disclose a method for operating a steam generator of the above-cited type by means of which the quality of a predictive feedwater or mass flow regulation can be improved even further and the enthalpy of the flow medium at the evaporator outlet can be kept particularly stable in particular when load changes occur. At the same time the aim is in particular to improve further the concept from the EP 2 065 641, the disclosure of which is expressly incorporated herein by reference. A further object of the invention is to disclose a forced-flow once-through steam generator that is suitable for performing the method.

With regard to the method, this object is achieved according to the invention in that a characteristic correction value for the time derivative of the enthalpy or the density of the flow medium at the input of one or more of the heating surfaces is taken into account in the determination of the setpoint value for the feedwater mass flow.

In this case the invention proceeds on the basis of the consideration that the existing concepts for predictive mass flow regulation of a once-through steam generator can be improved even further in terms of the quality of control for the adjustment of the feedwater mass flow by consistently taking into account correction values identified as relevant during the determination of a suitable setpoint value for the feedwater mass flow. Especially when load changes or other transient events occur during the operation of the once-through steam generator it should be taken into account in this case that the specific volume of the flow medium can change during such events. From said specific volume change of the flow medium, caused for example by changes in temperature, there result on the fluid or flow medium side temporary or transient storage or release effects into or, as the case may be, out of the corresponding heating surfaces of the steam generator. These type of storage/release effects attributable to density changes of the fluid or flow medium as a result of temperature changes induce mass flow fluctuations at the output of the respective heating surfaces, such that the mass flow being discharged from the respective heating surface is not the same as the inflowing mass flow and in particular not the same as the mass flow conveyed by the feedwater pump. This means that under such conditions the throughflow rate through the respective heating surface and the mass flow conveyed by the feedwater pump no longer run in synchronism, with the result that in such circumstances more or less severe enthalpy fluctuations, which are undesirable per se, are to be expected at the evaporator outlet.

In order to counteract said effects in a suitable manner with the aim of achieving a further improvement in predictive mass flow regulation, suitable correction terms should be provided for compensation purposes during the feedwater regulation. Provided as a particularly suitable means for this purpose is the acquisition of characteristic values for the time derivative of suitable parameters such as in particular the enthalpy or density of the flow medium at the inlet of the respective heating surface.

In an advantageous embodiment storage or release effects on the fluid side in a preheater heating surface of the once-through steam generator are evaluated in such a manner. Specifically with regard to the typically comparatively large content of water or flow medium conveyed into the preheater or economizer heating surfaces in heat recovery steam generators, changes in density of the flow medium contained therein namely have a comparatively serious impact on the evaporator throughflow rate and consequently on the evaporator outlet enthalpy, such that suitably taking into account and compensating for said effects is particularly favorable in the determination of a suitable setpoint value for the feedwater mass flow.

In this case the correction value that is to be taken into account during the determination of the setpoint value for the feedwater mass flow is advantageously determined by taking into account for the time derivative of the density of the flow medium both at the input and at the output of the respective heating surface. In this case an average fluid or medium density in the preheater can be defined and calculated in particular by means of suitable temperature and pressure measurements at the inlet and at the outlet of the respective preheater or economizer heating surface, with a linear density profile beneficially serving as a basis. A characteristic value for the fluid-side storage and release effects can then be determined from a change in the thus determined average density of the flow medium in the preheater. If in this case the heat supply into the preheater heating surface should drop, for example due to the occurrence of a load change, then flow medium will be stored there temporarily. At a constant delivery flow of the feedwater pump the mass flow would therefore decrease at the outlet of the preheater heating surface or at the inlet of a downstream evaporator heating surface. In order to compensate, the delivery flow of the feedwater mass pump is preferably increased temporarily by means of a corresponding correction signal for the setpoint value of the feedwater mass flow so that the feedwater mass flow at the evaporator inlet and consequently as a result also the enthalpy at the evaporator outlet can be kept virtually constant.

In contrast, for a suitable acquisition of fluctuations in the evaporator throughflow rate that result due to fluid-side storage and release effects in the evaporator itself, it must be taken into account that as a rule no representatively suitable average density of the flow medium can usually be defined in the evaporator due to the parallel occurrence of water and steam in the manner of a two-phase mixture on account of the strong nonlinearity of the mixture density resulting therefrom. Furthermore a local displacement of the start of evaporation during transient events must be reckoned with in the evaporator, thus further increasing the difficulty of arriving at a suitable definition of an average density of the flow medium.

In order nonetheless to be able to respond to medium-side storage and release processes as a result of transient events in a suitable manner also in the region of the actual evaporator heating surface, it is advantageously provided to take into account in addition the change in the evaporator inlet enthalpy in a suitable manner when providing the correction value. In this case it is assumed that in the event of a reduction in the enthalpy at the evaporator inlet due to the cooling-down of the flow medium storage effects are to be expected which reduce the evaporator throughflow rate and are directly linked with an increase in the evaporator outlet enthalpy.

The acquisition of the time derivative of the enthalpy or the density of the flow medium provided for the purpose of recording the transient effects is advantageously performed by way of a suitable differentiation element to which suitable parameters or measured values, such as e.g. temperature and pressure of the flow medium at the respective measurement point, are supplied on the input side. In this case the differentiation element is advantageously implemented as what is termed a "derivative element", also referred to as a "DT1 element". According to its characteristics a "derivative element" of said type corresponds to a closed-loop control functionality "1-lag element", a lag element for its part having a characteristic corresponding to "$1-e^{-t/T}$". This results overall in a characteristic of the "derivative element" corresponding to a decaying exponential function.

When taking into account storage and release effects in a preheater heating surface, a "DT1 element" of this type is advantageously used for evaluating the characteristic curve of the density (calculated by correspondingly measured pressure and temperature values) at the inlet or outlet of the preheater heating surface. The correction signal generated for the feedwater mass flow in the process can particularly effectively compensate for the fluid-side storage effects in the preheater heating surface in this case in particular when a suitable amplification and a suitable time constant are chosen for the respective "DT1 element". In this case the full media volume of the preheater heating surface, i.e. corresponding to the total water content in the preheater heating surface, is advantageously chosen for the amplification of the "DT1 element", and half the throughflow time of the flow medium through the preheater heating surface is chosen for the time constant. In a particularly advantageous embodiment the time constant can in this case be adjusted according to the current load status of the once-through steam generator, the circumstance beneficially being taken into account that at a lower load of the once-through steam generator the throughflow time of the flow medium through the preheater heating surface increases correspondingly.

In a particularly advantageous development the setpoint value for the feedwater mass flow is specified on the basis of the ratio from the heat flow currently transferred from the heating gas to the flow medium in the evaporator heating surface on the one hand and a setpoint enthalpy increase of the flow medium in the evaporator heating surface specified with regard to the desired live steam status on the other hand, the heat flow transferred from the heating gas to the flow medium being determined taking into account a characteristic temperature value for the current temperature of the heating gas at the evaporator outlet and a characteristic mass flow value for the current mass flow of the heating gas.

This allows a particularly demand-oriented precontrolled calculation, related to the actual system status, of the required feedwater volume on the basis of a heat flow balancing of the evaporator, which can, where appropriate, optionally also include following superheater heating surfaces. In this case the characteristic temperature value for the current temperature of the heating gas at the evaporator inlet enables in particular a particularly reliable and consequently demand-oriented characteristic value to be determined for the heating gas enthalpy at the evaporator inlet taking into account the heating gas enthalpy at the evaporator outlet which for its part can be calculated on the basis of the characteristic mass flow value for the current mass flow, and consequently allows a particularly reliable and demand-oriented determination of the currently available heat or current heat transfer from the heating gas to the feedwater. From this it is possible to determine the desired setpoint enthalpy increase of the flow medium in the evaporator heating surface taking into account the specified setpoint enthalpy increase, i.e. in particular the difference between the setpoint enthalpy of the flow medium at the evaporator outlet determined taking into account the desired live steam parameters and the actual enthalpy at the evaporator inlet determined from suitable measured values such as e.g. pressure and temperature, wherein a setpoint value for the feedwater mass flow that is a suitable value for this purpose can be calculated from the ratio between said variables.

Preferably a characteristic value that is particularly representative of the current situation is taken into account as a characteristic temperature value and/or as a characteristic mass flow value for the suitable quantitative description of the heating gas entering the evaporator. Characteristic values of this kind can be determined in a suitable manner on the basis of currently available measured data and in particular with recourse to stored characteristic storage values. However, a particularly reliable evaluation of the heat flow balance and consequently the determination of a particularly accurately precalculated feedwater setpoint value are made possible in that a currently acquired measured value is advantageously taken into account in each case as a characteristic temperature value and/or as a characteristic mass flow value.

The heat flow transferred from the heating gas to the flow medium is advantageously determined on the basis of a heat flow balance in which the enthalpy difference of the heating gas between evaporator inlet and evaporator outlet is used as a basis as the primary input variable. In a further advantageous embodiment, however, it is also taken into account for a particularly reliable calculation of the characteristic value that the reduction, expressed by said enthalpy difference, in the energy content in the exhaust gas during its passage through the evaporator heating surface can in fact lead on the one hand to an enthalpy increase in the flow medium within the evaporator heating surface, but on the other hand also to energy storage and/or release effects in the components of the evaporator, i.e. in particular in the steam generator tubes and other metallic components. For a particularly reliable determination of the enthalpy difference actually transferred to the flow medium within the evaporator heating surface, this aspect of the energy storage and/or release of heat in the metal masses is suitably taken into account as a characteristic correction value by which the enthalpy difference of the heating gas is suitably modified.

In the determination of the enthalpy difference of the heating gas the current enthalpy of the heating gas at the evaporator outlet is advantageously taken into account in that it is determined on the basis of the pressure of the flow medium at the evaporator inlet, taking into account the characteristic mass flow value for the current mass flow of the heating gas. The characteristic mass flow value which in this case is preferably present in the form of a measured value, though alternatively it can also be calculated indirectly via further parameters with recourse to stored correlations or other characteristic values, is in this case advantageously converted initially into what is called the "pinchpoint" of the steam generator, i.e. into the temperature difference between the outlet temperature of the exhaust gas and the boiling temperature of the flow medium at the evaporator inlet, said temperature difference beneficially being added to a boiling temperature of the flow medium determined on the basis of the pressure at the evaporator inlet and the enthalpy of the heating gas at the evaporator outlet being determined from said sum.

The determined actual enthalpy is advantageously used as a basis for determining the setpoint enthalpy increase of the flow medium in the evaporator heating surface on the one hand, based on suitable measured values such as e.g. the pressure and the temperature of the flow medium at the evaporator inlet. In addition, a setpoint value for the enthalpy of the flow medium at the evaporator outlet is specified as a function of or taking into account the desired steam state, for example the specified steam parameters or also the steam content at the evaporator outlet, taking into account the current pressure of the flow medium at the outlet of the evaporator heating surface.

The once-through steam generator can in this case be operated in what is known as a "Benson control mode", wherein although superheating of the flow medium is usually present at the outlet of the evaporator heating surface, overfeeding of a water reservoir connected downstream of the evaporator heating surface can be taken into account in said mode and the following heating surfaces can be partially supplied with still unevaporated flow medium, with the result that the full evaporation of the flow medium only takes place in the following heating surfaces. In a mode of this type the setting of a setpoint temperature lying above the saturation temperature of the flow medium by a specified temperature difference of, for example, 35° C. can be specified in particular as the desired steam parameter for the flow medium at the outlet of the evaporator. Particularly with a mode of operation of the steam generator such as this it may be desirable to take suitable account of the current operating state of superheater heating surfaces connected downstream of the evaporator heating surface in that their cooling requirement is transferred to a suitable increased supply of feedwater to the system. For this purpose a current cooling requirement at injection coolers connected downstream of the evaporator heating surface is advantageously taken into account in the specification of the setpoint value for the enthalpy of the flow medium at the outlet of the evaporator heating surface. The setpoint live steam temperature should therefore be reached in particular as far as possible by means of a suitable adjustment of the feedwater flow so that the additional cooling requirement at the injection coolers can be kept particularly low. Conversely, in the event that too low a live steam temperature is detected, the setpoint enthalpy value of the flow medium at the evaporator outlet can be suitably increased so that a feedwater volume that is dimensioned correspondingly low can be supplied via the thus modified setpoint value for the feedwater mass flow.

Alternately the steam generator can also be operated in what is termed a "level control mode", in which the water level in a water reservoir connected downstream of the evaporator heating surface is varied and correctively adjusted, its being necessary to avoid an overfeeding of the water reservoir as far as possible. In this case the water level inside the water reservoir is kept as far as possible within a specified setpoint range, wherein, in an advantageous embodiment, a fill level correction value is taken into account for the setpoint value for the feedwater mass flow, said correction value characterizing the deviation of the actual status of the fill level in the water reservoir from an assigned setpoint value.

With regard to the forced-flow once-through steam generator, the cited object is achieved in that a feedwater flow regulation assigned to a device for adjusting the feedwater mass flow is configured for specifying the setpoint value for the feedwater mass flow on the basis of the aforesaid method. The forced-flow once-through steam generator is embodied in this case in a particularly advantageous manner as a heat recovery steam generator which is impinged upon on the heating gas side by the exhaust gas from an associated gas turbine system.

The advantages achieved by means of the invention are in particular that by taking into account the time derivative of the enthalpy or density of the flow medium at the input of one or more of the heating surfaces of the once-through steam generator it is made possible to correct the setpoint value for the feedwater mass flow determined as part of a predictive mass flow regulation, wherein suitable account can also be taken inter alia of the storage or release processes in the heating surfaces on the fluid or flow medium side, in particular in the preheaters. Particularly when load changes or other transient events occur in which such storage or release processes are to be expected, it is made possible to determine a demand-oriented setpoint value for the feedwater mass flow that has a particularly high value in qualitative terms.

BRIEF DESCRIPTION OF THE DRAWINGS

An exemplary embodiment of the invention is explained in more detail with reference to a drawing, in which the FIGURE schematically shows a forced-flow once-through steam generator with assigned feedwater flow regulation.

DETAILED DESCRIPTION OF INVENTION

The forced-flow once-through steam generator 1 according to the FIGURE has a preheater heating surface 2, also referred to as an economizer, for feedwater provided as a flow medium which is contained in a gas flue that is not shown in greater detail. On the flow medium side a feedwater pump 3 is connected upstream and an evaporator heating surface 4 downstream of the preheater heating surface 2. On the output side the evaporator heating surface 4 is connected on the flow medium side via a water reservoir 6, which can also be embodied in particular as a water separator or separation vessel, to a plurality of downstream superheater heating surfaces 8, 10, 12 which for their part can be provided with injection coolers 14, 16 for the purpose of adjusting the steam temperatures and the like. The forced-flow once-through steam generator 1 is embodied as a heat recovery boiler or heat recovery steam generator, the heating surfaces, i.e. in particular the preheater heating surface 2, the evaporator heating surface 4 and the superheater heating surfaces 8, 10, 12 being arranged in a heating gas duct which is impinged upon on the heating gas side by the exhaust gas from an associated gas turbine system.

The forced-flow once-through steam generator 1 is configured for controlled impingement with feedwater. Toward that end a throttle valve 22 actuated by a servomotor 20 is connected downstream of the feedwater pump 3 so that the volume of feedwater conveyed by the feedwater pump 3 in the direction of the preheater heating surface 2 or the feedwater mass flow can be adjusted by way of suitable actuation of the throttle valve 22. In order to determine a current characteristic value for the supplied feedwater mass flow, a measurement device 24 for determining the feedwater mass flow $\dot{M}$ through the feedwater line is connected downstream of the throttle valve 22. The servomotor 20 is activated by way of a control element 28 to the input side of which are applied a setpoint value $\dot{M}$ supplied via a data line 30 for the feedwater mass flow $\dot{M}$ and the current actual value of the feedwater mass flow $\dot{M}$ determined via a measurement device 24. By forming the difference between said two signals a corrective adjustment requirement is communicated to the controller 28 so that a corresponding corrective adjustment of the throttle valve 22 by way of the activation of the servomotor 20 is performed if the actual value deviates from the setpoint value.

In order to determine a particularly demand-oriented setpoint value $\dot{M}s$ for the feedwater mass flow $\dot{M}$ in the manner of a predictive, anticipatory or future- or current-demand-oriented adjustment of the feedwater mass flow, the data line 30 is connected on the input side to a feedwater flow regulator 32 configured for specifying the setpoint value $\dot{M}s$ for the feedwater mass flow $\dot{M}$. Said regulator is configured for determining the setpoint value $\dot{M}s$ for the feedwater mass flow $\dot{M}$ on the basis of a heat flow balance in the evaporator heating surface 4, the setpoint value $\dot{M}s$ for the feedwater mass flow $\dot{M}$ being specified on the basis of the ratio of the heat flow currently transferred from the heating gas to the flow medium in the evaporator heating surface 4 on the one hand and a setpoint enthalpy increase of the flow medium in the evaporator heating surface 4 specified with regard to the desired live steam state on the other hand. A use of a concept of this type for providing a setpoint value for the feedwater mass flow on the basis of a heat balance even for a forced-flow once-through steam generator 1 designed as a heat recovery boiler is achieved in the exemplary embodiment in particular in that the heat flow transferred from the heating gas to the flow medium is determined taking into account a temperature value that is characteristic of the current temperature of the heating gas at the evaporator inlet and a mass flow value that is characteristic of the current mass flow of the heating gas.

Toward that end the feedwater flow regulator 32 has a division element 34 which is supplied with a suitable characteristic value for the heat flow currently transferred from the heating gas to the flow medium in the evaporator heating surface 4 as numerator and a characteristic value suitably specified with regard to the desired live steam state for the desired setpoint enthalpy increase of the flow medium in the evaporator heating surface 4 as denominator. On the numerator side the division element 34 is in this case connected on the input side to a function module 36 which, on the basis of a supplied characteristic temperature value for the current temperature of the heating gas at the evaporator inlet, outputs a value for the enthalpy of the heating gas at the evaporator inlet as its output value. In the exemplary embodiment the supply of a characteristic measured value for the current temperature of the heating gas at the evaporator inlet is in this case provided as a temperature value. The characteristic value for the enthalpy of the heating gas at the evaporator inlet is output to a subtraction element 38, where a characteristic value for the enthalpy of the gas at the evaporator outlet supplied by a function module 40 is subtracted from said characteristic value.

In order to determine the enthalpy of the heating gas at the evaporator outlet, the function module 40 is supplied on the input side with a sum of two temperature values formed by a summation element 42. In this case on the one hand the saturation temperature of the flow medium determined by way of a function element 44 which is connected to a pressure sensor 46 on the input side is taken into account on the basis of the pressure of the flow medium at the evaporator inlet. On the other hand the so-called "pinchpoint", i.e. the temperature difference, determined from the mass flow of the heating gas, of the heating gas temperature at the evaporator outlet minus the boiling temperature of the flow medium at the evaporator inlet, is taken into account via a function element 48 to which for its part a mass flow value characteristic of the current mass flow of the heating gas is supplied by way of a further function element 50. Accordingly the enthalpy of the heating gas at the evaporator outlet is provided by the function module 40 from said two temperature contributions added via the summation element 42, where necessary with recourse to suitable tables, diagrams or the like. On the output side the subtraction element 38 therefore yields the enthalpy difference or balance of the heating gas, i.e. the difference formed from the heating gas enthalpy at the evaporator inlet and the heating gas enthalpy at the evaporator outlet.

Said enthalpy difference is passed on to a multiplier element 52 to which the characteristic mass flow value which can moreover be present as the currently recorded measured value is likewise supplied. On the output side the multiplier element 52 thus yields a characteristic value for the heat output emitted by the exhaust gas to the evaporator heating surface 4.

In order to be able to determine the heat flow actually transferred to the flow medium from this heat power output by the heating gas, a correction by heat storage and/or release effects in and/or from the components of the evaporator heating surface 4, in particular into the metal masses, is initially provided. For this purpose the cited characteristic value for the heat output emitted by the heating gas is initially supplied to a subtraction element 54, where a correction value that is characteristic of the heat stored in or released from the evaporator components is subtracted. This is provided by a function element 56. This for its part has the output value of a further function element 58 applied to it on its input side by an average temperature value for the metal masses of the evaporator heating surface 4 being determined. For this purpose the further function element 58 is connected on the input side to a pressure sensor 60 arranged in the water reservoir 6, so that the further function element 58 can determine the average temperature of the metal masses on the basis of the pressure of the flow medium, e.g. by equating it with the boiling temperature associated with this pressure, in the water reservoir 6.

On the output side the subtraction element 54 thus passes a characteristic value for the heat output emitted by the heating gas, reduced by the heat output stored in the metal of the evaporator heating surface 4, and thus for the heat output that is to be emitted to the flow medium.

Said characteristic value is used in the division element 34 as the numerator, which is divided there by a denominator which corresponds to a setpoint enthalpy increase of the flow medium in the evaporator heating surface 4 specified with regard to the desired live steam state, such that the setpoint value $\dot{M}s$ for the feedwater mass flow $\dot{M}$ can be formed from this division or this ratio. In order to provide the denominator, i.e. the characteristic value for the desired setpoint enthalpy increase on the water, steam or flow medium side, the division element 34 is connected to a subtraction element 70 on the input side. This has a characteristic value provided by a function element 72 for the desired setpoint value for the enthalpy of the flow medium at the evaporator outlet applied to it on the input side. Furthermore the subtraction element 70 has a characteristic value or actual value for the current enthalpy of the flow medium at the evaporator inlet provided by a function module 74 applied to it on its input side, which value is subtracted in the subtraction element 70 from the cited characteristic value for the setpoint value of the enthalpy at the evaporator outlet. On the input side the function module 74 is in this case connected to the pressure sensor 46 and to a temperature sensor 76 for the purpose of forming the cited characteristic value for the actual enthalpy at the evaporator inlet. Thus, as a result of forming the difference in the subtraction element 70, the enthalpy increase to be introduced into the flow medium in the evaporator heating surface 4 as a function of the desired live steam state is determined and can be used as a denominator in the division element 34.

The forced-flow once-through steam generator 1 could be configured for operation in the so-called "level control mode", in which the water level in the water reservoir 6 is regulated, with only steam being passed on to the superheater heating surfaces 8, 10, 12 connected downstream of the evaporator heating surface 4 and the water still entrained on the evaporator outlet side being separated in the water reservoir 6. In the exemplary embodiment, however, the forced-flow once-through steam generator 1 is configured for operation in the so-called "Benson control mode", in which an overfeeding of the water reservoir 6 also provided as a water separator and the complete evaporation of the flow medium is possible only in the following superheater heating surfaces 8, 10, 12. In this operating mode variant the function element 72, via which the setpoint value for the enthalpy of the flow medium at the evaporator outlet is to be output, has applied to it on the input side on the one hand the actual value determined by means of the pressure sensor 60 for the pressure in the water separator 6. Also connected upstream of the function module 72 on the input side is a further function module 90 which determines on the basis of the actual pressure in the water reservoir 6 determined by the pressure sensor 60 a suitable setpoint value for the temperature of the flow medium in the water reservoir 6 with the aid of a stored functionality or the desired live steam state. For example, for operation of the installation in the "Benson control mode" a temperature value could be stored in this case as the setpoint value for the temperature which corresponds to the saturation temperature of the flow medium at the determined pressure plus a provided minimum overheating of, for example, 35° C. From said setpoint value for the temperature the function module 72 determines the cited setpoint value for the enthalpy of the flow medium at the evaporator outlet, taking into account the current pressure value.

In the exemplary embodiment this setpoint value provided by function module 72, which is essentially oriented to the properties of the flow medium as such, is subsequently modified in a downstream addition element 92 by a further correction value. Said further correction value supplied by a function module 94 essentially takes into account in the manner of a trim function the deviation of the currently established live steam temperature from the live steam temperature actually desired with regard to the desired live steam state. A deviation of this kind can become evident in particular in that if the live steam temperature in the injection coolers 14, 16 is too high a requirement for cooling arises and consequently it is necessary for cooling medium to be applied to the injection coolers 14, 16. If a mass flow of this type to the injection coolers 14, 16 is established, the function module 94 is configured with the aim of transferring said cooling requirement away from the injection coolers 14, 16 and toward an increased feedwater supply. With an accordingly established cooling requirement in the injection coolers 14, 16, the desired enthalpy of the flow medium at the evaporator outlet will be lowered accordingly in the function module 94 in order to minimize the cooling requirement. Otherwise, i.e. if too low a live steam temperature is detected, the enthalpy setpoint value is increased by the correction value provided by the function module 94 and its addition in the addition module 92.

In order to ensure this the feedwater flow regulator 32 of the forced-flow once-through steam generator 1 also comprises a downstream direct control loop in which an actual value for the enthalpy of the flow medium at the evaporator outlet is determined in a function module 100 on the basis of the measured values in the water reservoir 6, and is compared in a differentiation module 102 with the desired enthalpy, i.e. with the setpoint enthalpy value. In this case the setpoint-actual deviation is established by forming the difference in the differentiation module 102, which deviation is overlaid on the setpoint value for the feedwater mass flow provided by the division element 34 by way of a downstream controller 104 in an addition module 106. Said overlaying is effected with a suitable time delay and attenuated such that this control intervention occurs only when necessary, i.e. if the control deviation is too coarse.

In order to improve even further the quality of control in the predictive mass flow regulation of the forced-flow once-through steam generator 1 there is additionally provided for the generation of the setpoint value $\dot{M}_s$ for the feedwater mass flow $\dot{M}$ the taking into account of a correction value K which represents the time derivative of enthalpy and density values of the flow medium at suitable measurement points. Toward that end the intermediate value output by the addition module 106 is supplied to a further addition element 108 where it is overlaid with the correction value K.

In order to determine the contributions or summands for the correction value K, on the one hand a function module 110 provided for the purpose of determining a characteristic density value for the flow medium at the inlet of the preheater heating surface 2 is connected on the input side to a pressure sensor 112 disposed in the inlet zone of the preheater heating surface 2 and to a temperature sensor 114 likewise disposed in the inlet zone of the preheater heating surface 2. On the basis of the measured values supplied by these sensors the function module 110 determines a characteristic value for the density of the fluid or flow medium in the inlet zone of the preheater heating surface 2, which value is output to a downstream addition element 116. A further function module 118 is for its part connected on the input side to the pressure sensor 48 and the temperature sensor 76 and from the measured values supplied by the latter determines a characteristic density value for the fluid or flow medium on the outlet side of the preheater heating surface 2. This further characteristic density value is also output to the addition element 116 by the function module 118.

The addition element 116 for its part outputs the sum formed from the incoming characteristic density values to a downstream division element 120 in which the said sum is divided by the factor 2 as denominator. On the output side the division element 120 therefore provides a value that is characteristic of the average fluid or feedwater density in the preheater heating surface 2. This value is supplied to a downstream differentiation element 122.

The differentiation element 122 is embodied as what is termed a "derivative element" or "DT1 element" and yields as its output value a characteristic value for the time derivative of the characteristic density value of the fluid or flow medium yielded by the division element 120, which value is output to a downstream subtraction element 124.

Additionally provided is a further differentiation element 126 which has applied to it on the input side the characteristic value generated by the function module 74 for the actual enthalpy at the evaporator inlet. The differentiation element 126 which for its part is likewise implemented as a so-called "derivative element" or "DT1 element" therefore yields a characteristic value for the time derivative of the enthalpy at the input of the evaporator heating surface 4.

In the subtraction element 124 said characteristic value is subtracted from the characteristic value supplied by the differentiation element 122 for the time derivative of the density values of the flow medium. Thus, the subtraction element 124 yields an output value which is linearly composed of contributions for the time derivative of the density of the flow medium at the inlet of the preheater heating surface 2, the time derivative of the density of the flow medium at the outlet of the preheater heating surface 2 and the time derivative of the enthalpy of the flow medium at the input of the evaporator heating surface 4. Accordingly, said correction value formed from the cited proportions takes into account by way of the cited time derivatives fluid-side storage or release effects in the preheater heating surface 2 and/or in the evaporator heating surface 4 when transient events or load changes occur. Said correction value is overlaid in the addition element 108 on the setpoint value $\dot{M}_s$ for the feedwater mass flow density.

The invention claimed is:

1. A method for operating a once-through heat-recovery steam generator comprising a plurality of evaporator heating surfaces and a plurality of preheater heating surfaces connected upstream on a flow medium side, the method comprising:
connecting the plurality of preheater heating surfaces upstream of the plurality of evaporator heating surfaces of the once-through heat-recovery steam generator;
providing a device for adjusting a feedwater mass flow;
generating a setpoint value for the feedwater mass flow, wherein a correction value for a time derivative of a density of a flow medium at an input and an output of one or more of the preheater heating surfaces, and
for a time derivative of an enthalpy at an input of one or more of the evaporator heating surfaces is incorporated in the generating of the setpoint value such that the correction value is linearly composed of
the time derivative of the density of the flow medium at the input of a first preheater heating surface, the time derivative of the density of the flow medium at the output of the first preheater hating surface, and the time derivative of the enthalpy of the flow medium at the input of a first evaporator heating surface; and supplying the setpoint value for the feedwater mass flow to the device for adjusting the feedwater mass flow.

2. The method as claimed in claim 1, wherein the time derivatives are determined in each case by a differentiation element.

3. The method as claimed in claim 2, wherein the differentiation element assigned to the first preheater heating surface includes an amplification factor corresponding to a total volume of the flow medium in the first preheater heating surface.

4. The method as claimed in claim 2, wherein the differentiation element assigned to the first preheater heating surface includes a time constant corresponding to approximately half a throughflow time of the flow medium through the first preheater heating surface.

5. The method as claimed in claim 3, wherein the differentiation element assigned to the first preheater heating surface includes a time constant corresponding to approximately half a throughflow time of the flow medium through the first preheater heating surface.

6. The method as claimed in claim 1, wherein the setpoint value for the feedwater mass flow is specified based upon a ratio from a heat flow currently transferred from a heating gas to the flow medium in the first evaporator heating surface, and a setpoint enthalpy increase of the flow medium in the first evaporator heating surface specified with regard to a desired live steam state, wherein the heat flow transferred from the heating gas to the flow medium is determined by considering a temperature value which is characteristic of a current temperature of the heating gas at an evaporator inlet and a mass flow value that is characteristic of a current mass flow of the heating gas.

7. The method as claimed in claim 6, wherein the characteristic temperature value is a currently measured value.

8. The method as claimed in claim 6, wherein the characteristic mass flow value is a current measured value.

9. The method as claimed in claim 6, wherein the heat flow transferred from the heating gas to the flow medium is determined based upon an enthalpy difference of the heating gas between the evaporator inlet and an evaporator outlet.

10. A forced-flow once-through heat-recovery steam generator, comprising:

a plurality of evaporator heating surfaces;

a plurality of preheater heating surfaces connected upstream of the plurality of evaporator heating surfaces on a flow medium side of the once-through heat-recovery steam generator; and a device for adjusting a feedwater mass flow which is ducted based upon a setpoint value for the feedwater mass flow, wherein an assigned feedwater flow regulator is configured for the purpose of specifying the setpoint value based on a method, the method comprising:

generating the setpoint value for the feedwater mass flow, wherein a correction value for a time derivative of a density of a flow medium at an input and an output of one or more of the preheater heating surfaces, and for a time derivative of an enthalpy at an input of one or more of the evaporator heating surfaces is incorporated in the generating of the setpoint value such that the correction value is linearly composed of the time derivative of the density of the flow medium at the input of a first preheater heating surface, the time derivative of the density of the flow medium at the output of the first preheater hating surface, and the time derivative of the enthalpy of the flow medium at the input of a first evaporator heating surface; and wherein feedwater flow regulator supplies the setpoint value for the feedwater mass flow to the device for adjusting the feedwater mass flow.

11. The steam generator as claimed in claim 10, wherein an exhaust gas from an associated gas turbine system is input into the steam generator on a heating gas side.

12. The steam generator as claimed in claim 10, wherein the time derivatives are determined in each case by a differentiation element.

13. The steam generator as claimed in claim 12, wherein the differentiation element assigned to the first preheater heating surface includes an amplification factor corresponding to a total volume of the flow medium in the first preheater heating surface.

14. The steam generator as claimed in claim 12, wherein the differentiation element assigned to the first preheater heating surface includes a time constant corresponding to approximately half a throughflow time of the flow medium through the first preheater heating surface.

15. The steam generator as claimed in claim 10, wherein the setpoint value for the feedwater mass flow is specified based upon a ratio from a heat flow currently transferred from a heating gas to the flow medium in the first evaporator heating surface, and a setpoint enthalpy increase of the flow medium in the first evaporator heating surface specified with regard to a desired live steam state, wherein the heat flow transferred from the heating gas to the flow medium is determined by considering a temperature value which is characteristic of a current temperature of the heating gas at an evaporator inlet and a mass flow value that is characteristic of a current mass flow of the heating gas.

16. The steam generator as claimed in claim 15, wherein the characteristic temperature value is a currently measured value, wherein the characteristic mass flow value is a current measured value, and wherein the heat flow transferred from the heating gas to the flow medium is determined based upon an enthalpy difference of the heating gas between the evaporator inlet and an evaporator outlet.

* * * * *